Jan. 18, 1949.　　　T. K. COLLINS, JR　　　2,459,624
CONTROL CIRCUIT
Filed March 29, 1945

WITNESSES:
E. A. M⁰Closkey
New. C. Groove

INVENTOR
Thomas K. Collins, Jr.
BY
F. W. Lyle.
ATTORNEY

Patented Jan. 18, 1949

2,459,624

UNITED STATES PATENT OFFICE 2,459,624

CONTROL CIRCUIT

Thomas K. Collins, Jr., Fort Benton, Mont., assignor to Westinghouse Electric Corporation, East Pittsburgh, Pa., a corporation of Pennsylvania Application March 29, 1945, Serial No. 585,564

6 Claims. (Cl. 315—238)

My invention relates to electronic control circuits and, in particular, comprises an arrangement which may be referred to as a frequency de-multiplier, that is to say, a device which produces pulses of output voltage equal in frequency to those of an input voltage up to a certain value of frequency, then having half the frequency of the input pulses up to twice the first-mentioned frequency, then having a frequency equal to ⅓ of the input frequency up to a frequency equal to three times the first-mentioned frequency, and so on. Such a frequency de-multiplier has numerous uses. To take one instance, it is well known to be useful in the arts to make so-called stroboscopic examinations of moving machines; that is to say, the machines are viewed by intermittent flashes of light having a frequency which is approximately equal to the rate of revolution of one of their parts, or to such rate of revolution multiplied or divided by a small integral number. One device for furnishing such intermittent flashes of light is known as a "Strobotron" and comprises a grid controlled tube which flashes every time a voltage pulse is impressed on its conrtol grid. However, it is found as a practical matter that many such tubes only operate satisfactorily when the frequency of the impressed pulses is not greater than some predetermined number, such, for example, as 150 flashes per second. On the other hand, it may be desirable to vary the speed of a machine undergoing observation through a very wide range, in the lower portions of which it is preferable to observe it in operation with flashes occurring, let us say, every revolution; during an intermediate range of its speeds, flashes every two revolutions will suffice; and during the higher speed range, flashes every three revolutions will suffice. The de-multiplier which I herein describe will be seen to be adapted to operate the illuminating agency with such frequencies as I have just mentioned.

One object of my invention is, accordingly, to provide an electric circuit in which voltage output pulses occur at the same frequency as voltage input pulses throughout one range of frequency of the latter, and occur with a frequency which is a simple fraction or submultiple of the frequency of the input pulses over other frequency ranges of the latter.

Another object of my invention is to provide an arrangement in which output voltage pulses can be produced having a frequency which is related to the frequency of input pulses in a ratio $1/n$ where $n$ is an integral number which remains constant over a predetermined range of input frequency, but alters to a different value for one or more other input frequency ranges.

Still another object of my invention is to produce an arrangement in which output voltage pulses may be produced which have a frequency bearing a ratio to the frequency of input voltage pulses which is represented by a fraction $1/n$, $n$ being an integral number which remains constant throughout equal stages of input frequency, but which changes by an integral number from each such stage to the succeeding one.

A still further object of my invention is to produce an arrangement capable of generating light flashes having a frequency which is an integral submultiple of the frequency of voltage pulses in an input circuit.

A further object of my invention is to provide an arrangement capable of producing light flashes having a frequency equal to the frequency of revolution of a mechanism as long as such frequency of revolution does not exceed a definite number $k$, said light flashes then having a frequency equal to ½ the frequency of revolution of the mechanism for the range $k$ to $2k$, then having a frequency equal to ⅓ the frequency of revolution while the latter is within a range $2k$ to $3k$, and so on.

Other objects of my invention will become apparent upon reading the following description taken in connection with the drawing, in which Figure 1 is a schematic diagram of an electric circuit embodying the principles of one form of my invention;

Figure 1:
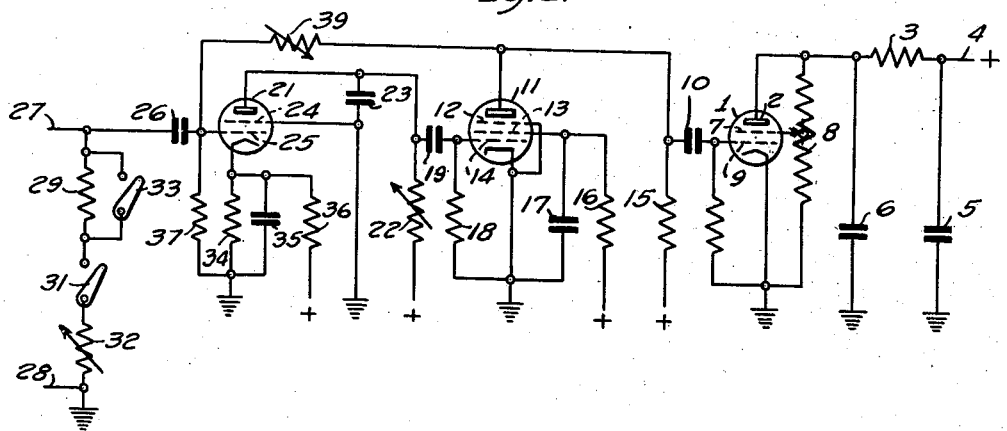

Referring in detail to Fig. 1, a gaseous electrical discharge device 1, which may, for example, be a hot-cathode tube with an atmosphere of mercury vapor, is provided with an anode 2 connected through a suitable resistor 3 to the positive terminal 4 of a voltage source having its opposite terminal grounded. A capacitor 5 is connected to discharge current through the device 1 when the latter is in a readily-conductive condition. A second capacitor 6, which may be of materially smaller capacity than capacitor 5, is shunted between the anode and the cathode of the device 1, and a grid 7 is connected to a suitable tap point on a resistor 8 likewise shunted between the anode and cathode of the device 1. The device 1 is likewise provided with a suitable control grid 9 and the tap point on the resistor 8 is preferably adjusted so that the device 1 is substantially nonconductive until a positive voltage pulse of predetermined magnitude is impressed on the control grid 9. Such a pulse may be impressed through capacitor 10. The tube 1 may be referred to as a strobotron.

An amplifier tube 11, which may be of the high vacuum type provided with a suppressor grid 12, a screen grid 13 and a control grid 14, has its cathode grounded and its anode connected to capacitor 10 and also through a resistor 15 to the positive terminal of a suitable voltage source having its negative terminal grounded. The potential of the screen grid 13 is in accordance with the practice well known in the amplifier art connected to a positive terminal of a voltage source through a resistor 16, and is connected by a capacitor 17 to the cathode of the tube 11. The control electrode 14 is connected to said cathode through a resistor 18 likewise connected through a suitable capacitor 19 to the anode of a gaseous discharge grid controlled cathode tube, or thyratron 21. The anode of the tube 21 is likewise connected through a resistor 22 in the way well known in the art to the positive terminal of a voltage source having its negative terminal grounded. The anode of the tube 21 is likewise connected through a capacitor 23 to ground, and a shield grid electrode 24 in the tube 21 is likewise grounded. A control electrode 25 in the tube 21 is connected through a capacitor 26 to one terminal 27 of an input circuit, the other terminal 28 of which may be grounded. The input terminals 27, 28 are impressed with voltage pulses of a control frequency which it is desired to demultiply in accordance with my invention. Across the terminals 27, 28 are preferably connected a resistor 29, a switch 31 and a resistor 32 in series with each other. A switch 33 is arranged so that the resistor 29 may be shunted out of circuit when desired.

The cathode of the tube 21 is connected to ground through a cathode resistor 34 shunted by a suitable capacitor 35, and is likewise connected through a resistor 36 to the terminal of a suitable voltage source having its other terminal grounded. The control electrode 25 is likewise connected to ground through a resistor 37.

The elements in Fig. 1, so far described, constitute an operative system by which the discharge device 1 may be caused to emit light flashes equal in frequency to the number of voltage pulses impressed across the terminals 27, 28 as long as such frequency does not exceed some predetermined limit, such, for example, 150 pulses per second. When, however, the frequency of these input pulses exceeds a certain value $k$, it will be found that the discharge device 1 flashes only once for every two voltage pulses impressed on the terminals 27, 28. It will, likewise, be found that when the frequency of these input pulses is raised above the value $2k$, the discharge device 1 will flash only once for every third voltage pulse on the input circuit; and so on until the number of voltage pulses impressed on the terminals 27, 28 exceeds some critical value $c$. Raising the frequency of the input voltage pulses above this critical value $c$ will be found to be incapable of causing further flashing of the discharge device 1.

The foregoing mode of operation of the above-described circuit may be explained somewhat as follows:

The values of the voltage impressed on resistor 36 and on resistor 22 are first adjusted so that the tube 21 is nonconductive when no voltage is impressed through the capacitor 26. Under these circumstances, the capacitor 23 will charge through the resistor 22 to the full voltage of the positive terminal connected to the latter. If now the switch 31 is closed and a sufficient positive pulse of voltage impressed through capacitor 26 on control electrode 25, the tube 21 will be rendered conductive and the capacitor 23 will discharge with great rapidity through the tube 21 and capacitor 35. By giving a suitable value to the resistor 34 and to the capacitors 23 and 35, the inherent inductance in the circuit of capacitor 23 will cause the latter to discharge so completely that the tube 21 will be rendered nonconductive. The voltage pulse employed on the terminals 27, 28 is made of very short duration, and under such conditions the tube 21 remains nonconductive while the capacitor 23 is gradually charged through the resistor 22. The charge of the capacitor 23 may be represented by the upper curves in Fig. 2, in which abscissae represent time and ordinates represent voltage of the capacitor 23. As is well known, the charging curve is approximately an exponential.

Figure 2:
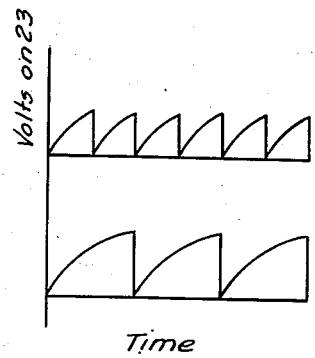
Fig. 2 is a voltage v. time diagram which will be referred to in explaining the operation of my invention.

This charging of capacitor 23 will continue until a second voltage pulse of sufficient magnitude on the line 27, 28 renders the tube 21 conductive, at which time the capacitor 23 will again discharge through the tube 21. Such successive charges and discharges of the capacitor 23 through tube 21 will continue as indicated in Fig. 2, the periodic time of the successive discharges represented by the vertical portions of the upper curve being equal to the periodicities of the pulses impressed on the terminals 27, 28. In short, as the frequency of the voltage charges impressed on the terminals 27, 28 is increased, the capacitor 23 will discharge with an increased frequency, one discharge for each such voltage pulse.

Figure 3:
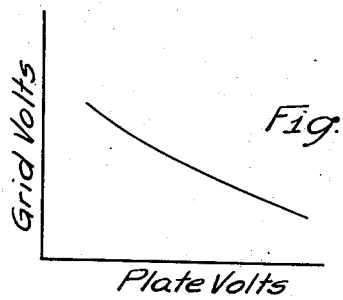
Fig. 3 is a graph useful in explaining my invention.

There is, however, a limitation on the ability of the above-described arrangement to operate in the manner just outlined. It is found that the time at which the tube 21 will be rendered conductive depends upon the voltage impressed on its anode and also upon the voltage impressed on its control electrode 25. The curve of Fig. 3 shows the relationship between these two quantities and indicates that when the voltage impressed on the anode by capacitor 23 is low, a high input voltage must be impressed on the control electrode 25 to render tube 21 conductive, but that the input voltage which will cause the tube 21 to be conductive, decreases as the voltage of the capacitor 23 increases.

The rate at which the capacitor 23 charges is, of course, dependent upon the value of the resistor 22. It is possible, by giving the resistor 22 a very large value, to cause the capacitor 23 to attain so low a voltage when the next voltage pulse occurs on terminals 27, 28 after a discharge of capacitor 23, that the combined effect of the voltage impressed on tube 21 by capacitor 23 and the pulse impressed thereon by the input circuit 27, 28 is insufficient to render the tube 21 conductive. Under such conditions, the capacitor 23 will not discharge upon incidence on the line 27, 28 of the first voltage pulse following discharge of capacitor 23. However, capacitor 23 will continue to charge until a second voltage pulse is impressed across the terminals 27, 28.

The successive discharges of the capacitor 23 will then be represented by the lower curve in Fig. 2. In other words, capacitor 23 will discharge only once for every two voltage pulses on the input line.

The rate at which the capacitor 23 charges can, of course, be varied by varying the resistor 22 so that this affords one means of determining whether the capacitor 23 discharges for every voltage pulse arriving at the terminal 27 or only once for every second such voltage pulse. However, since the discharge of the tube 21 is likewise dependent on the magnitude of the voltage pulse impressed on the control electrode 25, the voltage to which the capacitor 23 must charge before the tube 21 becomes conductive, can be regulated at will by varying the resistor 32 which since the lines 27, 28 contains substantial impedance, controls the magnitude of the voltage pulse impressed on control electrode 25. Thus, with a given setting of resistor 22, the tube 21 may by making the resistor 32 large enough be caused to conduct once for every voltage pulse arriving over the lines 27, 28; by reducing the value of the resistor 32 somewhat, tube 21 may be caused to conduct having every second voltage pulse arriving over the lines 27, 28; by still further reducing the value of the resistor 32, the tube 21 can be made to conduct only once for every third pulse arriving over the lines 27, 28; and so on. The value of K, the pulse frequency at which condenser 23 will discharge only every second pulse over line 27, 28 may be fixed at will for any setting of resistor 32 by varying resistor 22, or the magnitude of voltage impressed on tube 21 through resistor 22, or the magnitude of the voltage pulses arriving at terminals 27, 28.

The discharge of the capacitor 23 obviously impresses negative voltage pulses through the capacitor 19 on the control electrode 14 of the tube 11, thereby producing corresponding amplified voltage pulses in the output resistor 15 of the latter, one pulse for each discharge of the capacitor 23. The voltage pulses impressed on the resistor 15 may be made to act through the control electrode 9 to render the tube 1 of the device 1 conductive, and cause it to emit a light flash every time the capacitor 23 discharges. The number of light flashes emitted by the device 1 may thus, by proper adjustment of the resistor 32, be made equal to any submultiple of the number of voltage pulses impressed per second on the terminals 27, 28.

The resistor 34 and the voltage impressed on the resistor 36 may be made in ways well known to those skilled in the art to produce such a high negative feedback on the control electrode of the tube 21 as to prevent it breaking into self-oscillation, as it might do except for the presence of the resistor 34. It has been found in actual practice that when the frequencies impressed on terminals 27, 28 are closed to the critical frequency $k$, the system will be unstable sometimes flashing at the frequency $k$ and sometimes at the frequency $k/2$. This is probably due to small unintended variations in the amplitude of voltage pulses at terminals 27, 28, ripple in the D. C. voltage supplies, or the like. To avoid this range of instability at or near the frequency $k$, the switch 33 may be closed thereby insuring that the unstability range is slightly raised or opened to insure that it is lowered.

It will be remembered to have been stated that when the frequency impressed on the terminals 27, 28 exceeds a certain critical value $c$, no further flashing of the device 1 was produced. In certain instances, it is desirable in practice to insure that the value of the critical frequency $c$ is made extremely high. This may be accomplished by adding to the portions of Fig. 1, so far described, the feedback connection comprising the resistor 39 connected from the anode of the tube 11 to the control grid 25. It will be noted that because of line impedance the amplitude of the voltage pulses impressed on terminals 27, 28 decreases, as the frequency of the pulses impressed on those terminals grows greater. I have found that the voltage on the anode of tube 11 varies in such a way with increase of frequency of voltage pulses impressed on terminals 27, 28 as to feed back a voltage through resistor 39 to the grid 25 which permits repeated flashing of the device 1 to continue at very high frequencies of the voltage pulses impressed on terminals 27, 28. For example, the introduction of the feedback resistor 39 increased the maximum critical frequency $c$ from about 1000 to 4000 cycles per second in many tests.

This same feedback channel, by impressing an altered voltage on the control electrode 25 when the frequency of input pulses passes through the value $k$, insures that the capacitor 23 must charge to higher voltage to return the system from a slower flashing to a faster flashing condition than is necessary to cause the system to pass in the opposite direction. The feedback channel through resistor 39 in this way eliminates the above-mentioned frequency instability in the neighborhood of frequencies $k$, $2k$, $3k$, etc., and makes the use of the switch 33 unnecessary.

Figure 4:
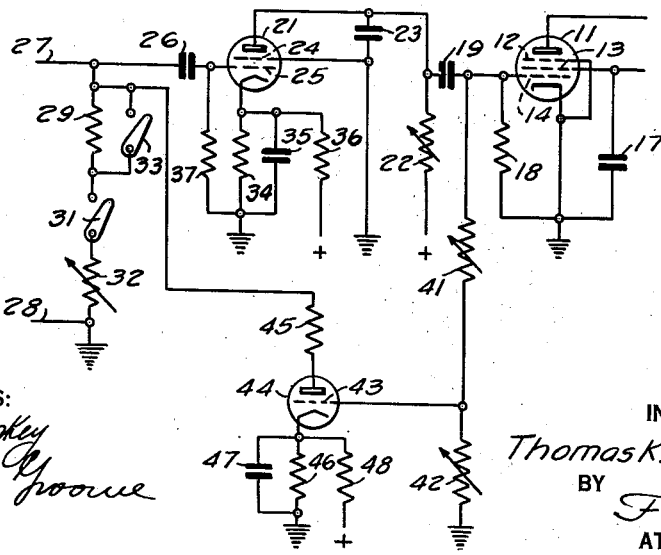
Fig. 4 is a modified form of a portion of the circuit of Fig. 1, which constitutes a different embodiment of my invention.

Another way of overcoming the instability of the system in the neighborhood of the frequency $k$ is illustrated in Fig. 4, in which like reference numerals indicate the same structural elements as in Fig. 1. In the Fig. 4 arrangement, a pair of resistors 41, 42 are connected between the control grid 14 of the tube 11 and ground, and the control grid 43 of a high vacuum triode 44 is connected to their common junction. The anode of the tube 44 is connected through a resistor 45 with the input terminal 27 and its cathode is connected through a resistor 46 shunted by a capacitor 47 to ground. A resistor 48 connects the cathode of tube 44 to a suitable biasing voltage source having its other terminal grounded.

I have found that the average voltage of the control grid 14 of tube 11 in Fig. 1 is higher when the system is in its flash-every-second-input-pulse condition than when in its flash-every-input-pulse condition. The control grid of the tube 44 is, accordingly, more positive when the system passes from the last-mentioned condition to the first-mentioned condition. In consequence, the tube 44 reduces the potential impressed on the control electrode 25 of tube 21 by an input pulse and makes it necessary for the capacitor 23 to charge to a higher voltage to energize tube 21 once for every input pulse than was the case when the system was initially in that condition. The circuit of Fig. 4 thus is a system which avoids the frequency instability characteristic of the Fig. 1 system when the feedback channel through resistor 39 is not present in the latter.

While I have described the elements 3, 8, 15, 22, 34, 29, 32, 39, 42, 45 and 46 as resistors it will be evident that they may be replaced by

I claim as my invention:

1. In combination, an input circuit having intermittent voltage pulses impressed thereon, an electrical discharge tube having a control electrode connected to said input circuit and having an output circuit, a capacitor in said output circuit, a source of voltage and an impedance serially connected to charge said capacitor, a luminous electrical discharge device having a control circuit, means for impressing a voltage varying with the voltage drop across said impedance across said control circuit, and means for feeding back to said input circuit a voltage varying with said voltage drop.

2. In combination, an input circuit having intermittent voltage pulses impressed thereon, a gaseous electrical discharge tube having a cathode resistor and a control electrode connected to said input circuit and having an output circuit, a capacitor in said output circuit, a source of voltage and an impedance serially connected to charge said capacitor, a luminous electrical discharge device having a control circuit, means for impressing a voltage varying with the voltage drop across said impedance across said control circuit, and means for feeding back to said input circuit a voltage varying with said voltage drop.

3. In combination, with an input circuit impressed with intermittent voltage pulses and a work circuit energizing an illuminating device which is desired to receive voltage pulses having a frequency which is a submultiple of said voltage pulses, an electrical discharge device having a control electrode connected to said input circuit and having an output circuit connected in shunt relation to a capacitor, a voltage source connected to charge said capacitor through an impedance, a second electrical discharge device having a control circuit and principal electrodes, means for impressing on said control circuit a voltage varying with the voltage drop in said impedance, means for connecting a feedback channel from a circuit energized by said principal electrodes and means for connecting said principal electrodes to said work circuit.

4. In combination with an input circuit impressed with intermittent voltage pulses, a gaseous electric discharge device having an input electrode and output electrodes, means for connecting said input circuit to said input electrode, means for connecting a capacitor to discharge through said output electrodes, a voltage source connected to charge said capacitor through an impedance, a second electrical discharge device having a control electrode circuit, an anode and a cathode, means for impressing the voltage drop in said impedance on said control electrode circuit, and means for connecting a feedback channel from a circuit energized by said anode and cathode to said input electrode.

5. In combination with an input circuit impressed with intermittent voltage pulses, a gaseous electric discharge device having an input electrode and output electrodes, means for connecting said input circuit to said input electrode, means for connecting a capacitor to discharge through said output electrodes, a voltage source connected to charge said capacitor through an impedance, a second electrical discharge device having a control electrode circuit, an anode and a cathode, means for impressing the voltage drop in said impedance on said control electrode circuit, a tube having principal electrodes and a control circuit, terminals for connecting said tube as a shunt for said input circuit, and means to impress a voltage derived from said control electrode on said control circuit.

6. In combination, an input circuit having intermittent voltage pulses impressed thereon, an electrical discharge tube having a control electrode connected to said input circuit and having an output circuit, a capacitor in said output circuit, a source of voltage and an impedance serially connected to charge said capacitor, an amplifier energized from the voltage drop across said impedance, an illuminating device which emits light-flashes in response to energization of a control circuit, means for impressing a voltage varying with the output of said amplifier across said control circuit, and means for feeding back a voltage derived from the output of said amplifier to said input circuit.

THOMAS K. COLLINS, Jr.

REFERENCES CITED

The following references are of record in the file of this patent:

UNITED STATES PATENTS

| Number | Name | Date |
| --- | --- | --- |
| 1,930,278 | Morrison | Oct. 10, 1933 |
| 2,140,350 | Dawson | Dec. 13, 1938 |
| 2,185,635 | Kock | Jan. 2, 1940 |
| 2,196,845 | Andrieu | Apr. 9, 1940 |
| 2,201,166 | Germeshausen | May 21, 1940 |
| 2,227,815 | Toulon | Jan. 7, 1941 |
| 2,341,541 | Grier | Feb. 15, 1944 |